United States Patent
Wollmershauser et al.

(10) Patent No.: US 10,142,182 B2
(45) Date of Patent: *Nov. 27, 2018

(54) ALLOCATING PROCESSING BANDWIDTH AT A RESIDENTIAL GATEWAY UTILIZING TRANSMISSION RULES

(71) Applicant: AT&T Intellectual Property I, L.P., Atlanta, GA (US)

(72) Inventors: Steven M. Wollmershauser, San Antonio, TX (US); Ahmad C. Ansari, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 464 days.

This patent is subject to a terminal disclaimer.

(21) Appl. No.: 13/915,931

(22) Filed: Jun. 12, 2013

(65) Prior Publication Data

US 2013/0272316 A1 Oct. 17, 2013

Related U.S. Application Data

(63) Continuation of application No. 11/086,793, filed on Mar. 22, 2005, now Pat. No. 8,488,451.

(51) Int. Cl.
*H04L 12/24* (2006.01)
*H04L 12/28* (2006.01)
*H04L 12/801* (2013.01)
*H04L 12/859* (2013.01)
*H04L 12/927* (2013.01)
*H04L 12/911* (2013.01)

(52) U.S. Cl.
CPC ...... *H04L 41/0896* (2013.01); *H04L 12/2856* (2013.01); *H04L 12/2872* (2013.01); *H04L 12/2874* (2013.01); *H04L 12/2898* (2013.01); *H04L 47/15* (2013.01); *H04L 47/2475* (2013.01); *H04L 47/70* (2013.01); *H04L 47/803* (2013.01); *H04L 47/808* (2013.01)

(58) Field of Classification Search
None
See application file for complete search history.

(56) References Cited

U.S. PATENT DOCUMENTS

| | | |
|---|---|---|
| 6,141,690 A | 10/2000 | Weiman |
| 6,208,640 B1 | 3/2001 | Spell et al. |
| 6,636,505 B1 | 10/2003 | Wang et al. |
| 6,711,162 B1 | 3/2004 | Ortega et al. |
| 6,747,577 B2 | 6/2004 | Chakravarty et al. |
| 6,928,508 B2 | 8/2005 | Tse |
| 6,948,070 B1 | 9/2005 | Ginter et al. |
| 7,035,270 B2 | 4/2006 | Moore, Jr. et al. |
| 7,075,927 B2 | 7/2006 | Mo et al. |
| 7,237,029 B2 | 6/2007 | Hino et al. |

(Continued)

*Primary Examiner* — Mohammad S Adhami
(74) *Attorney, Agent, or Firm* — Toler Law Group, PC

(57) ABSTRACT

A method includes, in response to determining that a transmission parameter of a communication received from a particular network device does not satisfy a bandwidth threshold indicated by a transmission rule, modifying the transmission parameter based on the transmission rule to produce a modified parameter. The particular network device is associated with a particular transmission rule that includes a particular data rate of network resources. The method includes applying the modified parameter to the communication.

20 Claims, 3 Drawing Sheets

(56) References Cited

U.S. PATENT DOCUMENTS

| | | | |
|---|---|---|---|
| 7,562,393 | B2 | 7/2009 | Buddhikot et al. |
| 7,843,907 | B1 | 11/2010 | Abou-Emara et al. |
| 7,881,309 | B2 | 2/2011 | Pirhonen et al. |
| 8,488,451 | B2 * | 7/2013 | Wollmershauser .......................... H04L 12/2856 370/230 |
| 2001/0030785 | A1 | 10/2001 | Pangrac et al. |
| 2001/0055308 | A1 | 12/2001 | Afrakhteh et al. |
| 2002/0006137 | A1 | 1/2002 | Rabenko et al. |
| 2002/0016801 | A1 * | 2/2002 | Reiley ............... G06F 17/30905 715/236 |
| 2002/0021465 | A1 | 2/2002 | Moore, Jr. et al. |
| 2003/0093814 | A1 * | 5/2003 | Birmingham ...... H04N 7/17318 725/136 |
| 2003/0221100 | A1 * | 11/2003 | Russ .................. H04N 21/8586 713/153 |
| 2004/0001496 | A1 | 1/2004 | Yusko et al. |
| 2004/0032882 | A1 * | 2/2004 | Kane ....................... H04L 29/06 370/477 |
| 2004/0133689 | A1 | 7/2004 | Vasisht |
| 2005/0010697 | A1 * | 1/2005 | Kinawi ............. G06F 17/30905 710/1 |
| 2005/0066339 | A1 * | 3/2005 | Thoen ............... H04N 21/23430 719/328 |
| 2005/0120128 | A1 | 6/2005 | Willes et al. |
| 2005/0155017 | A1 | 7/2005 | Berstis et al. |
| 2008/0013470 | A1 * | 1/2008 | Kopplin .............. H04L 12/5695 370/310 |
| 2010/0315966 | A1 | 12/2010 | Weigand |
| 2010/0332615 | A1 | 12/2010 | Short et al. |

\* cited by examiner

ALLOCATING PROCESSING BANDWIDTH AT A RESIDENTIAL GATEWAY UTILIZING TRANSMISSION RULES

CLAIM OF PRIORITY

The present application is a continuation of and claims priority from U.S. patent application Ser. No. 11/086,793, filed on Mar. 22, 2005 and entitled "SYSTEM AND METHOD FOR ALLOCATING PROCESSING BANDWIDTH IN A RESIDENTIAL GATEWAY UTILIZING TRANSMISSION RULES AND DATA MAPPING", the contents of which are expressly incorporated herein by reference in their entirety.

FIELD OF THE DISCLOSURE

The present disclosure relates generally to networked communications and more specifically to allocating the processing and transmitting resources of a residential gateway.

BACKGROUND

The public's desire to extend the functionality of the World Wide Web and other communication systems into their home continues to grow. Home devices that are connectable to the Internet, cable networks, satellite systems or communication networks generally can allow individuals to extend services provided by Internet service providers, telephone companies, cable TV companies, entertainment/media providers, satellite companies, utility companies and businesses generally, into their home. Residential gateways allow individuals to connect these service providers to many devices within their home. Devices such as personal digital assistants, telephones, computers, printers, facsimiles, televisions, appliances and other home networking devices can achieve both wired and wireless Internet connectivity within a home. Unfortunately, current techniques for managing communications between the various devices of a modern home network have several shortcomings.

BRIEF DESCRIPTION OF THE DRAWINGS

It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Figure 1:
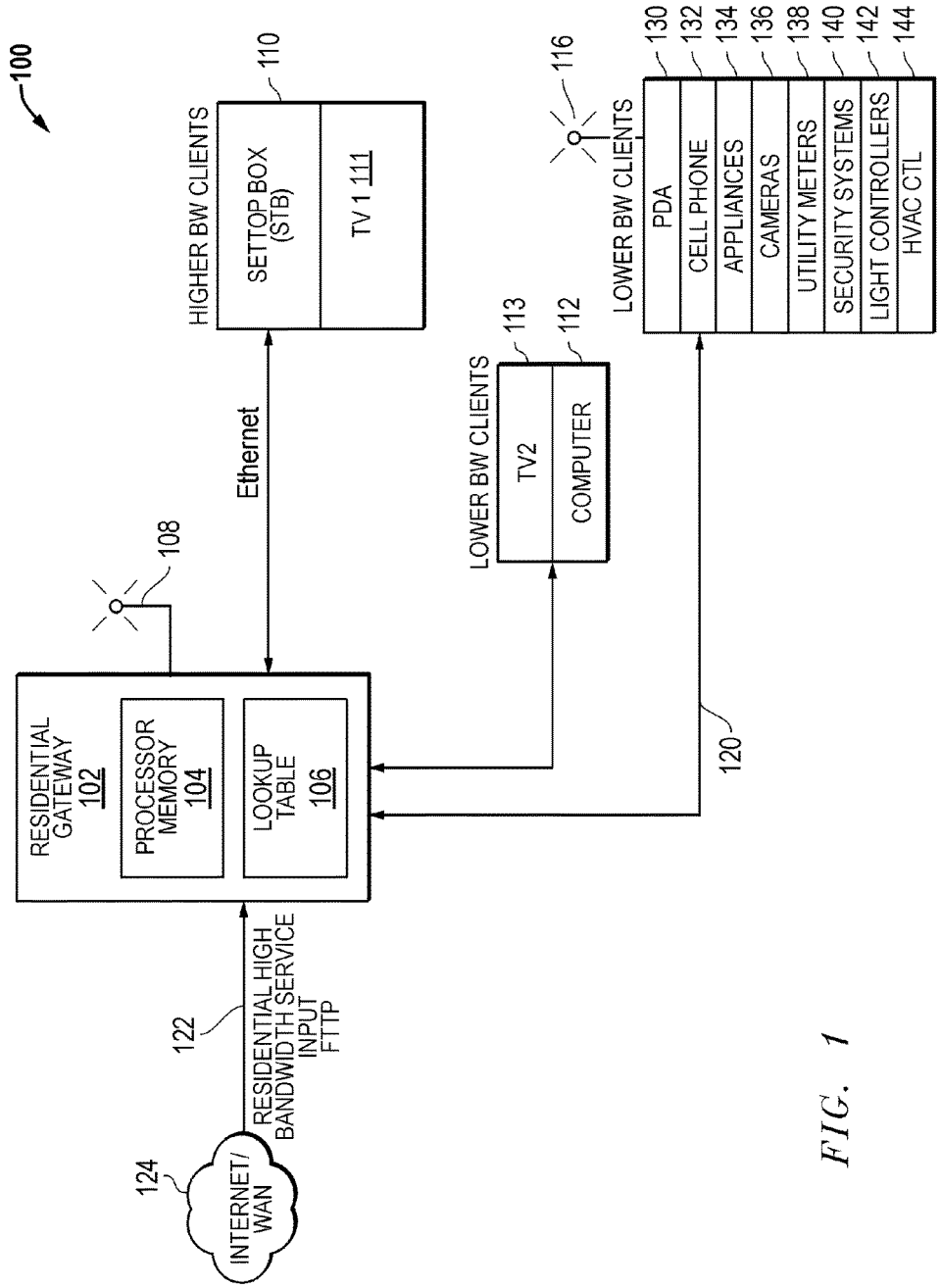
FIG. 1 is a diagram of an in-home network system connected to a wide area network.

A system and method of networking with configurable data mapping is disclosed. Data mapping can be utilized to match data transmission types with devices that can efficiently utilize the data transmission type. In one configuration, the data mapping teachings disclosed herein may be utilized to increase the processing efficiency of a home network and insure correct programming is allowed to pass to a device by applying a set of data transmission rules to data transmissions between a residential gateway and clients of the residential gateway. An exemplary method may include receiving a communication at a residential gateway from a client and identifying the client or the source of the transmission. The client may be identified by recognizing a programming format, a data transmission type, a client identifier embedded in the transmission, and an identification of a network device hosting the client. The identification may, in some cases, be made automatically upon reception of a data transmission. The identity of the transmission, the client or the device is then compared to the contents of a look-up table and the transmission can be modified or blocked according to predetermined transmission rules. In one embodiment a bandwidth allocation of a client request is utilized to allow the data stream, modify the data stream or block the data stream from being passed to a particular network client.

Using the identity, a data-mapping rule may be located utilizing a look-up table and the rule can then be applied to communications between the identified client and the residential gateway. Depending upon implementation detail, the data transmission rules can be auto configured by the system or manually configured by the user or a service provider. In practice, a residential gateway or a set top box may be utilized to manage the communications of network devices. In some cases, this mapping process of the residential gateway may help prevent a home network from malfunctioning when the network is heavily loaded. The teachings disclosed herein may help a residential gateway to "make good decisions" when determining what device should receive what type of transmission or programming when servicing both less important devices and extremely important devices. In other words, the processing performed to filter data resources of a residential gateway can inherently improve the quality of service for all network devices.

The concept of networking residential appliances and entertainment devices is growing in popularity, but there may be many reasons why home networking systems have not developed as quickly as some might like. One reason relates to the price of network equipment that has the required communication bandwidth to provide on-demand service to multiple high bandwidth devices. Multimedia services including video, audio, and interactive services (e.g. gaming), to home network devices such as computers, and televisions requiring substantial network bandwidth. Some other services such as those supporting PDAs and Cell Phones, home monitors and home lighting controllers require a smaller amount of bandwidth. Moreover, some home network devices communicate information that is not time sensitive. Some of these devices can only display limited amount of information on their viewing screens and at times may be able to wait a long period of time to receive replies to their request.

In one configuration of the present disclosure, home network devices such as computers, and televisions that receive streaming video or other high bandwidth applications can be efficiently serviced because the bandwidth allocated to other devices is limited. Devices such as those with smaller displays can require or can utilize programming or data transmissions that are tailored to fit their displays. The teachings herein can efficiently service multiple clients by determining bandwidth consumption of the tailored programming and permitting or restricting the tailored programming to flow to particular devices possibly based on the type of device.

In accordance with the teachings of the present disclosure and in one particular configuration, data transmission rules or data mapping by device type are stored in a table in the residential gateway. The rules can be applied to all transmissions destined for various devices from WAN to LAN through the residential gateway. The data transmission rules can be automatically configured utilizing a computer program or the rules can be configured, for example, by a user with the aid of a graphical user interface. The rules can be tailored to improve the utilization of the residential gateway's processing resources, while minimizing the resources consumed by certain network devices. Specifically, each network device, client, or transmission can be identified as the request is sent through the residential gateway to the programming Internet site.

Referring to FIG. 1, an illustrated system 100 for controlling communications within a household utilizing a residential gateway is provided. As depicted, system 100 may take a residential high bandwidth service input 122 and efficiently distribute the gateway's processing and transmitting resources to devices within the residence. In one configuration, a residential gateway 102 can transmit and receive data over the Internet 124 via the high bandwidth service input 122. The service input 122 could be a coaxial cable, a fiber to the premise, a satellite link, a digital subscriber (DSL) line or any other physical medium capable of supporting a broadband connection. Depending upon implementation detail, residential gateway 102 can include main components such as a processor, a memory 104, and a look up table 106.

The residential gateway 102 can also facilitate communications between clients residing on network devices in the home by routing and switching data between the devices. In addition, the residential gateway can route the data to and from the wide area network (WAN)/Internet 124. For example, residential gateway 102 can receive movies from a service provider formatted for television over the Internet 124 and send video streams to first television 111, second television 113 and computer 112 via residential gateway and/or first set-top box and second set top box.

Network based services designed to be viewed on a television, such as multimedia entertainment services typically require significant amount of data throughput and hence are referred to herein as high bandwidth services. The residential gateway 102 can also couple the Internet 124 to clients residing on network devices such as personal digital assistant (PDA) 130, cell phone 132, appliances 134, surveillance cameras 136, utility meters 138, security systems 140, light controllers 142, heating ventilating and air conditioning (HVAC) controller 144, or any other applications that require lower network bandwidth. The network devices accommodating lower bandwidth applications typically have smaller viewing screens and will function properly when provided with lower resolutions and lower frame rates that can be accommodated with a smaller bandwidth. Thus, depending upon implementation detail, a client requiring lower bandwidth applications can be assigned a less bandwidth rule preventing programming not designed for viewing on the smaller screens from being passed to these devices.

Communication link 120 is illustrated as a hard-wired connection to the lower bandwidth devices and clients 130, 132, 134, 136, 138, 140, 142 and 144, however the home network devices 110, 111, 112, 113, 130, 132, 134, 136, 138, 140, 142, and 144 can be coupled to the residential gateway 102 utilizing wires or by wireless communication links. First antenna 108 and second antennae 116 can facilitate the communication links. Second antennae 116 represents a plurality of antennas possibly implemented with each network devices.

Depending upon implementation detail, a set top box 110 can be coupled between the residential gateway 102 and the first television 111 or any other network device. The set top box 110 can act as a converter accepting commands from a handheld remote and correspondingly selecting specific television channels or Internet features. The set top box 110, which can typically convert standard or high definition video, to be displayed on the television (TV) can receive various IP video streams based on the design of the device. The set top box must have the correct high-bandwidth programming to display a quality picture on the TV and must not be allowed to receive low bandwidth applications intended for devices with smaller viewing screens such as PDAs and cell phones. In accordance with the bandwidth allocations and data mapping taught herein, the set top box 110 can provide IP video to high definition TVs or an analog conversion of the video to older model televisions.

Network programming from the WAN to the LAN typically utilize the Internet Protocol (IP) to deliver standard definition, high definition, standard definition or PIP peripheral interchange program or low bandwidth programming to various devices on the LAN. LAN transport protocols can include the following: Ethernet protocol, or Ethernet over one of the following technologies including; Wifi 802.11a, b, g, WiMax, (a.k.a. IEEE 8011 and IEEE 806), home phone line network alliance (HPNA), HomePlug or any other protocol suitable for communication between network devices.

In operation, the user can initiate a request for a universal resource locator (URL) or a universal resource identifier (URI) from various network devices (a URI or URL is a network address for a specific provider). This request can travel through the residential gateway 102 to servers connected to the WAN/Internet 124. When the residential gateway 102 processes these requests, lower bandwidth clients can request programming that has not been properly formatted for their particular screen. One way to identify an overreaching request is to determine the amount of bandwidth consumption required by the program being downloaded and compare it to the identified device.

The residential gateway can recognize that the requested programming is disproportionate to the device request based on a profile of the requesting device or the type of device requesting the programming. The device type or client type can be matched to the bandwidth of the programming request at the residential gateway 102 and the programming can be altered or blocked according to the bandwidth allocation/data mapping rules. In one embodiment, rules regarding bandwidth allocation to the network devices or clients are stored in look-up table 106. The rules can be applied to processing resources in the residential gateway 102 and other devices such as set top box 110 such that bandwidth resources are efficiently allocated in the local network.

A method incorporating teachings of the present disclosure may be better understood by elaborating on three parts of the process, 1) data mapping/rule configuration, 2) providing rules for the system, and 3) identifying the data transmission for mapping/rule application.

1) Transmission Configuration Rules for Gateway Operations.

Depending upon implementation detail, it is may be advantageous to allocate the processing resources of the residential gateway 102 or any communication switch within a residence, such that devices requiring substantial resources are provided with higher bandwidth or a quality service. Further, devices that can subsist on minimal resources are provided with lower bandwidth or a lower quality of service. Thus, the transmission rules/data mapping may be created and applied in order to manage the processing resources of the local area network or residential gateway 102.

In one configuration, an initial determination can be made whether to apply the processing and transmission rules based on available resources. The decision of whether to implement, or apply the rules can be made after resource utilization is determined. Depending upon implementation detail, when low bandwidth clients request services or transmissions from the residential gateway 102, the residential gateway 102 can determine if the programming will be allowed as the programming is being downloaded, by performing a look up, and then implementing an appropriate rule. Thus, communications can be made with each type of network device according to the rules.

In another configuration when the residential gateway 102 is busy, certain clients could be completely ignored, particularly low bandwidth non-essential clients. In another configuration a minimal amount of residential gateway resources could be utilized to provide a trickle of bandwidth to be shared by "less important" clients. The minimal amount could also be used to provide a "courtesy busy signal" to low bandwidth clients to keep the client communication link active.

2) Providing Rules to the System

The rules applied to the residential gateway resources can be user configured, downloaded over the Internet 124, installed on the residential gateway 102, and/or provided in some other effective fashion and stored in look-up table 106.

Figure 2:
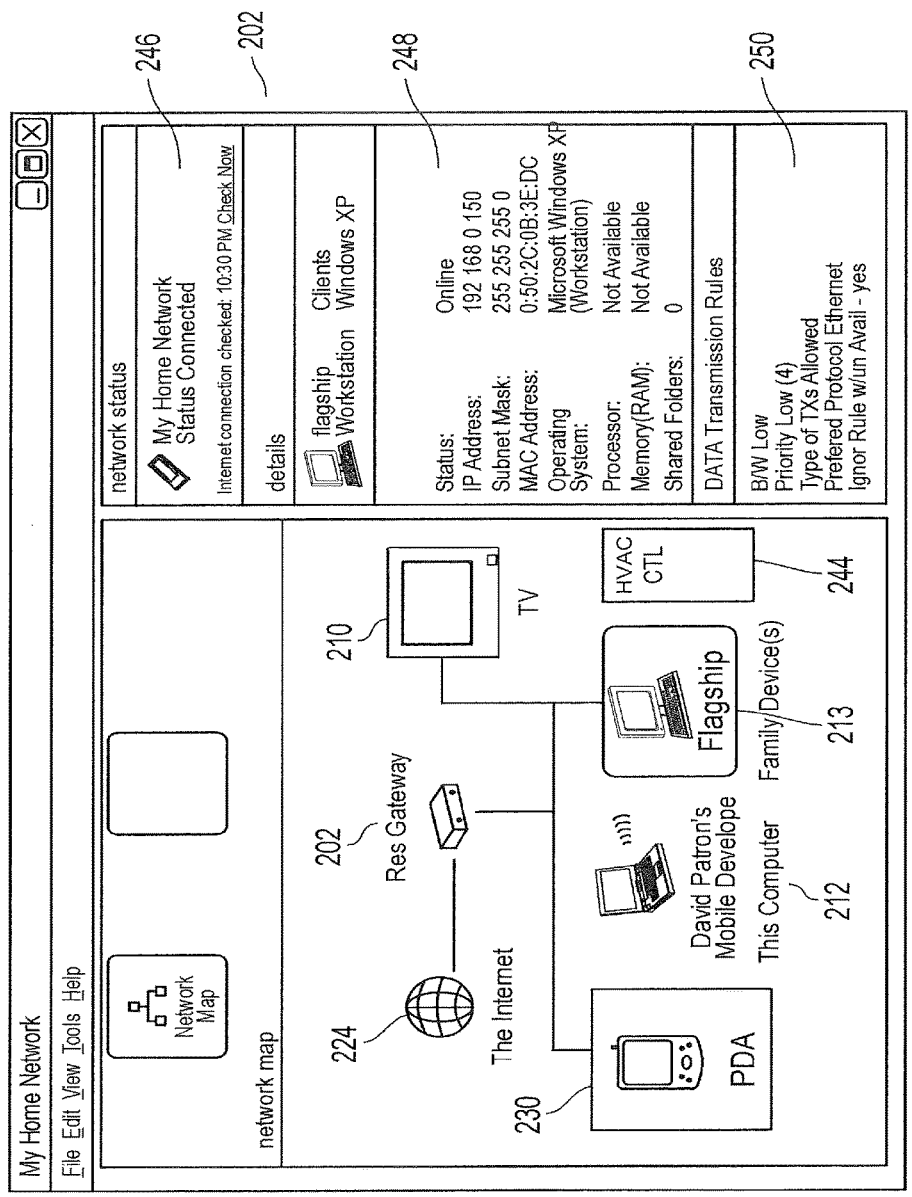
FIG. 2 is an illustration of a graphical user interface that could be utilized to configure data mapping and data transmission rules for a home network.

Referring to FIG. 2, a graphical user interface 202 (GUI) that could be utilized to configure bandwidth allocations and data mapping by creating, and defining the application of data transmission rules within a home network is illustrated. GUI 202 provides a block diagram of the network devices such as the Internet 224, residential gateway 202, television 210, PDA 230, first computer 212, second computer 213, cell phone, and HVAC controller 244. In the illustration, the "flagship" computer 213 has been selected by the user and the details of the data transmission rules created for the flagship computer 213 are illustrated in first window 250. In second window 246, the clients running on the network device flagship 213 are provided, and in third window 248 other networking details are provided such as an IP address of the network device flagship 213. The data provided in FIG. 2 could provide a portion of the contents stored in the look-up table 106.

A browser could also be utilized by an individual connected to the LAN or a service provider connected through the WAN to create and edit transmission protocol/data mapping rules for individual network devices or clients. In one configuration, the process includes assigning device identifiers, names or usernames to network clients or network devices and associating the identifier with at least one rule. In one implementation a processing priority can be assigned to the identifier and stored in a look up table configuration.

3) Identifying Clients for Rule Application

Some data transmissions may have a client identifier already embedded in the transmission while other transmission may not have an "inherent" cue as to the client or device associated with the transmission. Thus, in one configuration the residential gateway 102 can identify a client or device transmission by analyzing programming or data embedded in the transmission. Transmission types or programming such as e-mails, website addresses (e.g., URL or a URI), or the presence of video data may be utilized to allocate or apply a predetermined transmission rule/data mapping.

In another configuration, the client transmission can be identified based on the port to which the client or device is connected. The word "client transmission" used herein refers to transmissions intended for the client and/or transmissions from the client. Depending upon implementation detail, a system for tagging the data transmissions for identification can be accomplished. Thus, in an alternate embodiment a client identifier method is set up as part of the network infrastructure. Many methods could be utilized to tag or identify programming or data transmissions.

In one embodiment a client identifier is assigned to the client and the electronic identifier is utilized in transmissions. For example, a user name can be assigned to the network device or a client and the user name can be utilized to distinguish transmission from different devices/clients. In other embodiments, a media access control (MAC) address, an Internet protocol address, a private Internet protocol address, or any other alphanumeric identifier can be utilized. In yet another embodiment the protocol type or "language" of the transmission can be utilized to identify a device/client associated with a data transmission.

In further embodiments, groups of MAC addresses may be linked to the type of device or type of client. For example, makers of PDAs may assign groups of numbers to their PDAs. Thus, when a client has a MAC address that falls within a group of addresses, the transmission/device/client can be identified by the MAC address. In another embodiment, private IP addresses can be assigned to devices/clients and utilized to identify data transmissions.

Many additional methodologies could be utilized to link or map network devices/clients to transmission and processing rules. For example, a handshake process could occur where the residential gateway assigns user names or user IDs to the network devices/clients. Transmissions can be identified with information contained in the header of the transmission and the table can link a device/client to rules assigned to the data transmissions.

Referring back to FIG. 1, data transmissions between the residential gateway 102 and network devices/clients can be delayed or the client or network device can function at a modified (i.e. lower) data rate based on rule enforcement or execution. The processor, retrieving instructions from memory 104 can identify the originator of the transmission and utilize the look-up table 106 to determine rules for making the bandwidth allocation within the residential gateway 102 for the subject transmission. The processor can also apply the rules/mapping as it processes data transmissions with a network client of a network device. Thus, an appropriate programming bandwidth for the network device/client will be utilized to communicate with one or more devices/clients.

The present teaching can reduce the bandwidth requirements and complexity of the residential gateway 102. In one configuration the disclosed bandwidth management process could be utilized in all transmissions related to the devices/clients. Depending upon implementation detail, the residential gateway 102 could have high-speed ports and low speed ports and high-speed processors and low speed processors. The rules in the table could be utilized to allocate the high-speed components to the high bandwidth clients and the low-speed components to the lower bandwidth clients.

Figure 3:
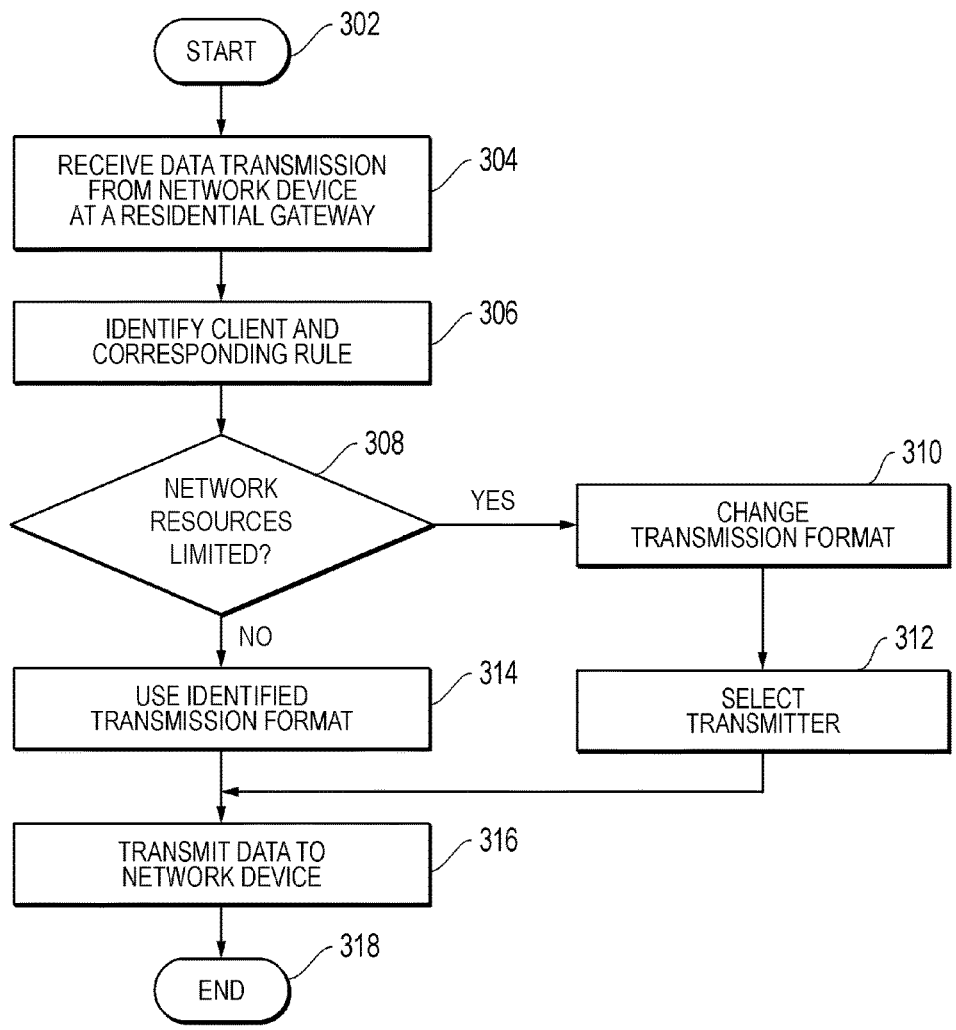
FIG. 3 is a flow chart of a method for controlling transmissions within a home network.

Referring to FIG. 3, a method of operation that may be utilized in connection with the system 100 of FIG. 1 is illustrated. The method starts at 302 and proceeds to 304 where a data transmission is received from a client residing on a network device at a residential gateway. The client requesting services is identified and a rule or mapping associated with the client is located at step 306. The identity of the client may be determined in many ways as discussed above. Depending upon implementation detail, the identifier may be assigned by the method of the present disclosure. A determination of whether network resources are limited may be made, at step 308. When the network resources are limited, the residential gateway may proceed to apply a rule or data mapping to change transmission format, at step 310 and may change a transmitter, at step 312 to maximize the residential gateway resources. The residential gateway may transmit data to a network device, at step 316. The method may then end, at step 318.

When the network resources are not limited, at step 308, the residential gateway may use a transmission format identified in the data transmission, at step 314. The residential gateway may transmit data to a network device, at step 316. The method may then end, at step 318.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving, at a residential gateway at a first time, a request from a local network client device for a network based service, the request received via a local area network supported by the residential gateway;
determining, at the residential gateway based on local area network resources available at the first time, whether to perform a transmission configuration operation to apply a set of rules for communications via the local area network;
conditioned upon determining not to perform the transmission configuration operation, bypassing the transmission configuration operation; and
conditioned upon determining to perform the transmission configuration operation, apply the set of rules by:
determining, at the residential gateway, an identity of the local network client device based on the request;
accessing a set of rules in a memory of the residential gateway to identify a particular rule of the set of rules, the particular rule associated with the identity of the local network client device; and
applying the particular rule to data corresponding to the network based service, wherein applying the particular rule includes allocating a high-speed port to a first group of local network devices and allocating a low-speed port to a second group of local network devices, wherein the local network client device is included either in the first group of local network devices or in the second group of local network devices based on the particular rule, wherein each of the first group of local network devices and the second group of local network devices includes other local network client devices.

2. The method of claim 1, wherein the particular rule indicates that a third group of devices is not to receive data relating to the network based service.

3. The method of claim 1, further comprising:
receiving, at the residential gateway, a second request from a second device of a third group of local network devices for a second network based service; and
sending a busy signal to the second device, wherein the particular rule does not allocate any resources to the third group of local network devices.

4. The method of claim 1, wherein the local network client device is included in the first group.

5. The method of claim 1, wherein the request corresponds to receiving the network based service in a first transmission format, wherein a second particular rule indicates that the local network client device is to receive the network based service in a second transmission format wherein the local network client device receives the network based service in the second transmission format in response to the request, and wherein the first transmission format is distinct from the second transmission format.

6. The method of claim 1, wherein the local network client device is included in the second group.

7. The method of claim 1, wherein applying the particular rule includes allocating a low speed processor to the second group.

8. The method of claim 1, wherein applying the particular rule includes allocating a high speed processor to the first group.

9. The method of claim 1, further comprising allocating a portion of the local area network resources of the residential gateway for low priority requests.

10. The method of claim 1, wherein the local network client device comprises a television, a set-top box device, a game system, a computer system, a mobile communication device, a controller, or a combination thereof.

11. The method of claim 1, further comprising accessing a look-up table storing the particular rule prior to applying the set of rules.

12. The method of claim 11, wherein the look-up table stores a priority associated with the local network client device.

13. The method of claim 1, wherein the particular rule enables communication to a particular network device that provides the network based service with sufficient bandwidth to maintain an active communication link between the local network client device and the particular network device.

14. A system comprising:
a processor; and
a memory accessible to the processor, the memory including instructions executable by the processor to perform operations comprising:
receiving, at a first time, a request from a local network client device for a network based service, the request received via a local area network;
determining, based on local area network resources available at the first time, whether to perform a transmission configuration operation to apply a set of rules for communications via the local area network;
conditioned upon determining not to perform the transmission configuration operation, bypassing the transmission configuration operation; and
conditioned upon determining to perform the transmission configuration operation, apply the set of rules by:

determining an identifier of the local network client device based on the request;

accessing a set of rules in the memory to identify a particular rule of the set of rules, the particular rule associated with the identifier of the local network client device; and applying the particular rule to data corresponding to the network based service, wherein applying the particular rule includes allocating a high-speed port to a first group of local network devices and allocating a low-speed port to a second group of local network devices, wherein the local network client device is included either in the first group of local network devices or in the second group of local network devices based on the particular rule, wherein each of the first group of local network devices and the second group of local network devices includes other local network client devices.

15. The system of claim 14, wherein an amount of available bandwidth corresponds to the local area network resources.

16. The system of claim 14, wherein the operations further comprise identifying the particular rule based on identification of a transmission format of the request, a transmission type of the request, an identifier of the local network client device, or a combination thereof.

17. The system of claim 16, wherein the identifier includes a media access control address, an Internet protocol address, a private Internet protocol address, a user name, or a combination thereof.

18. A computer-readable storage device including instructions executable by a processor to perform operations comprising:

receiving, at a first time, a request from a local network client device for a network based service, the request received via a local area network;

determining, based on local area network resources available at the first time, whether to perform a transmission configuration operation to apply a set of rules for communications via the local area network;

conditioned upon determining not to perform the transmission configuration operation, bypassing the transmission configuration operation; and conditioned upon determining to perform the transmission configuration operation, apply the set of rules by:

determining an identity of the local network client device based on the request;

accessing a set of rules in a memory to identify a particular rule of the set of rules, the particular rule associated with the identity of the local network client device; and applying the particular rule to data corresponding to the network based service, wherein applying the particular rule includes allocating a high-speed port to a first group of local network devices and allocating a low-speed port to a second group of local network devices, wherein the local network client device is included either in the first group of local network devices or in the second group of local network devices based on the particular rule, wherein each of the first group of local network devices and the second group of local network devices includes other local network client devices.

19. The computer-readable storage device of claim 18, wherein the local network client device is included in the first group.

20. The computer-readable storage device of claim 18, wherein the local network client device is included in the second group.

* * * * *